(12) United States Patent
Kondo et al.

(10) Patent No.: US 10,722,838 B2
(45) Date of Patent: Jul. 28, 2020

(54) CARBON DIOXIDE ABSORBENT AND CARBON DIOXIDE SEPARATION AND RECOVERY SYSTEM

(71) Applicant: KABUSHIKI KAISHA TOSHIBA, Tokyo (JP)

(72) Inventors: Asato Kondo, Kanagawa (JP); Takashi Kuboki, Tokyo (JP); Akiko Suzuki, Tokyo (JP); Mitsuru Udatsu, Kanagawa (JP); Hiroko Watando, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/699,576

(22) Filed: Sep. 8, 2017

(65) Prior Publication Data

US 2018/0272267 A1  Sep. 27, 2018

(30) Foreign Application Priority Data

Mar. 23, 2017  (JP) .................... 2017-057004

(51) Int. Cl.
*C08F 226/02* (2006.01)
*C08F 214/06* (2006.01)
(Continued)

(52) U.S. Cl.
CPC ......... *B01D 53/1475* (2013.01); *B01D 53/02* (2013.01); *B01D 53/025* (2013.01); *B01D 53/0423* (2013.01); *B01D 53/0462* (2013.01); *B01J 20/264* (2013.01); *B01J 20/3425* (2013.01); *B01J 20/3483* (2013.01); *C01B 32/50* (2017.08); *C08F 214/06* (2013.01);

*C08F 226/02* (2013.01); *B01D 2252/204* (2013.01); *B01D 2253/202* (2013.01); *B01D 2253/206* (2013.01); *B01D 2257/504* (2013.01); *C01B 2210/0051* (2013.01); *Y02A 50/2342* (2018.01); *Y02C 10/06* (2013.01); *Y02C 10/08* (2013.01)

(58) Field of Classification Search
None
See application file for complete search history.

(56) References Cited

U.S. PATENT DOCUMENTS 4,853,191 A    8/1989  Bruening et al.
7,637,983 B1 * 12/2009  Liu .................... B01D 67/0079
                                                210/500.21
(Continued)

FOREIGN PATENT DOCUMENTS

CN    105013292 A    11/2015
JP    S62-105912 A    5/1987
(Continued)

OTHER PUBLICATIONS

"Safety Data Sheet, (4-bromopentan-2-yl)(methyl)amine." Enaminestore.com, Jun. 2, 2015.*
(Continued)

*Primary Examiner* — Daniel Berns
(74) *Attorney, Agent, or Firm* — Finnegan, Henderson, Farabow, Garett & Dunner, L.L.P.

(57) ABSTRACT

A carbon dioxide absorbent of an embodiment includes a solid resin compound containing a structural unit expressed by the following formula (1). X in the formula (1) is a halogen element.

9 Claims, 1 Drawing Sheet formula (1)

formula (2)

formula (3)

formula (4)

formula (5)

(51) Int. Cl.

| | | |
|---|---|---|
| *B01D 53/02* | (2006.01) | |
| *B01D 53/04* | (2006.01) | |
| *B01D 53/14* | (2006.01) | |
| *B01J 20/22* | (2006.01) | |
| *C01B 32/50* | (2017.01) | |
| *B01J 20/34* | (2006.01) | |
| *B01J 20/26* | (2006.01) | |

(56) References Cited

U.S. PATENT DOCUMENTS

| | | |
|---|---|---|
| 2011/0229393 A1 | 9/2011 | Hu |
| 2012/0076711 A1 | 3/2012 | Gabald et al. |
| 2012/0161071 A1 | 6/2012 | Murai et al. |
| 2012/0164045 A1 | 6/2012 | Peiffer et al. |
| 2012/0304858 A1 | 12/2012 | Wright et al. |
| 2012/0308451 A1 | 12/2012 | Murai et al. |
| 2014/0370576 A1 | 12/2014 | Wright et al. |
| 2016/0144340 A1 | 5/2016 | Yogo et al. |
| 2017/0173518 A1 | 6/2017 | Chen et al. |
| 2017/0266607 A1 | 9/2017 | Watando et al. |

FOREIGN PATENT DOCUMENTS

| | | |
|---|---|---|
| JP | 2004-244595 A | 9/2004 |
| JP | 2004-244596 A | 9/2004 |
| JP | 2009-106909 | 5/2009 |
| JP | 2010-155753 | 7/2010 |
| JP | 2012-30222 A | 2/2012 |
| JP | 2012-505077 | 3/2012 |
| JP | 2012-139622 | 7/2012 |
| JP | 2012-143744 | 8/2012 |
| JP | 2012-143745 | 8/2012 |
| JP | 2012-179584 | 9/2012 |
| JP | 2012-525253 | 10/2012 |
| JP | 2012-245483 | 12/2012 |
| JP | 2015-9185 | 1/2015 |
| JP | 2015-160147 | 9/2015 |
| JP | 2016-3182 | 1/2016 |
| JP | 2017-164696 A | 9/2017 |
| WO | WO 2008/131132 A1 | 10/2008 |

OTHER PUBLICATIONS

"Safety Data Sheet, (4-chloropentan-2-yl)(methyl)amine." Enaminestore.com, Jun. 2, 2015.*

U.S. Appl. No. 15/251,166, filed Aug. 30, 2016.

* cited by examiner

 formula (1)
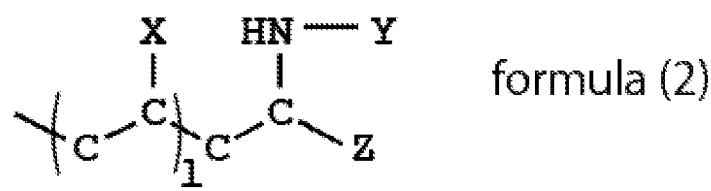 formula (2)
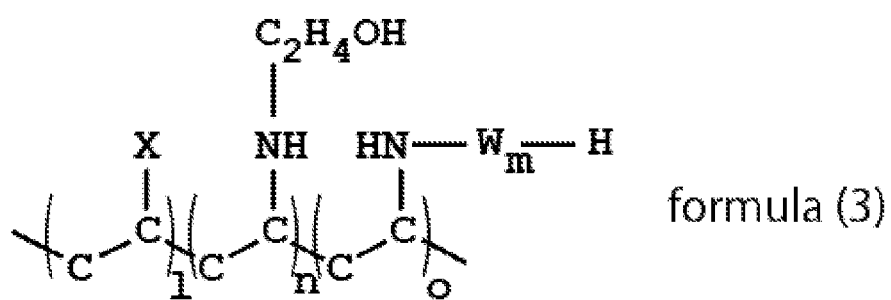 formula (3)
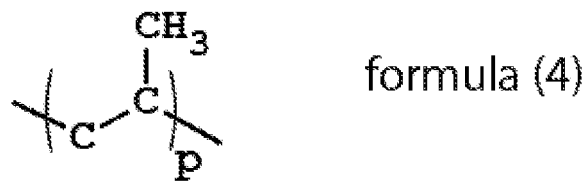 formula (4)
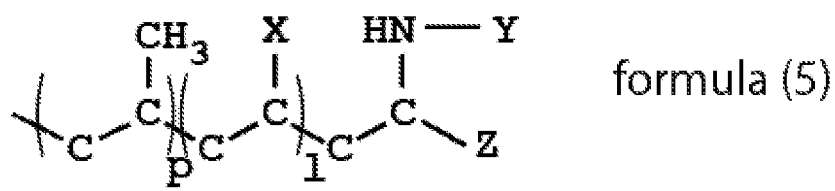 formula (5)

CARBON DIOXIDE ABSORBENT AND CARBON DIOXIDE SEPARATION AND RECOVERY SYSTEM

CROSS-REFERENCE TO RELATED APPLICATION

This application is based upon and claims the benefit of priority from Japanese Patent Application No. 2017-057004, filed on Mar. 23, 2017; the entire contents of which are incorporated herein by reference.

FIELD

Embodiments described herein relate to a carbon dioxide absorbent and a carbon dioxide separation and recovery system.

BACKGROUND

In recent years, in order to suppress global warming, reduction of carbon dioxide emissions into the atmosphere has been required. In particular, carbon dioxide ($CO_2$) emissions attributable to coal-fired power generation account for nearly 30% of worldwide $CO_2$ emissions, and reduction of carbon dioxide emissions from coal-fired power generation can be expected to have a large effect as a strategy for mitigation of global warming. One of technologies for separating, recovering and storing carbon dioxide (carbon capture and storage) (hereinafter, sometimes referred to as "CCS" herein) employs a recovery method using a chemical adsorption method, and plays an important role in reduction of the amount of carbon dioxide in boiler combustion exhaust gases in thermal power plants etc.

Typical CCS technology may include the following techniques. A combustion exhaust gas from a boiler is subjected to treatments such as denitration, dust collection and desulfurization as necessary, and then introduced into an absorption and regeneration tower, and the combustion exhaust gas and an absorbent liquid are brought into contact with each other in the absorption and regeneration tower. Accordingly, $CO_2$ in the combustion exhaust gas is absorbed into the absorbent liquid to remove $CO_2$ from the combustion exhaust gas. The absorbent liquid having absorbed $CO_2$ is heated by, for example, a hear exchanging device, and guided into the regeneration tower, and $CO_2$ is dissociated from the absorbent liquid in the regeneration tower, so that $CO_2$ is recovered. On the other hand, the absorbent liquid, from which $CO_2$ has been dissociated in the regeneration tower, is recycled to the above-mentioned absorption and regeneration tower, and reused for absorption of $CO_2$ in a combustion exhaust gas. As absorbent liquids to be used in such a CCS technology, many absorbent liquids containing amine and water have been investigated.

However, a large amount of energy is required to heat the whole amount of an absorbent liquid to 100° C. or higher in release of $CO_2$, and thus there arise problems in terms of $CO_2$ recovery efficiency and profitability. In addition, since the amine aqueous solution generates a large amount of degradation products such as amine derivatives, organic acids and amino acids due to long-term use, and thus causes a reduction in efficiency, it is necessary to periodically remove impurities or replace the absorbent liquid. As a method for recovering carbon dioxide in a gas, a plurality of kinds of methods have been known heretofore. Currently, a variety of methods are widely known. For example, a method in which carbon dioxide-containing gas is brought into contact with an alkanolamine aqueous solution in an absorption and regeneration tower to absorb carbon dioxide, the carbon dioxide recovery aqueous solution is then heated, and carbon dioxide is desorbed and recovered in a releasing tower was developed in the first half of the 1900s, and has been practically used since then. Here, examples of the alkanolamine include monoethanolamine, diethanolamine, triethanolamine, methyldiethanolamine, diisopropanolamine and the like are known, but usually monoethanolamine is used. However, when an aqueous solution of such an alkanolamine is used as an absorbent liquid, a degraded product of the amine corrodes the device, and therefore it is necessary to use expensive corrosion-resistant steel for the device, Further, in order to improve absorbed carbon dioxide desorption performance, the desorption temperature is increased, and thus there arises a problem that degradation of the amine is accelerated. There is also a disadvantage that much energy is needed for recovering carbon dioxide from the absorbent liquid due to the influence of water.

BRIEF DESCRIPTION OF THE DRAWINGS

FIG. 1 shows a chemical structural formula of units contained in a carbon dioxide absorbent according to an embodiment.

DETAILED DESCRIPTION

A carbon dioxide absorbent of an embodiment includes a solid resin compound containing a structural unit expressed by the following formula (1). X in the formula (1) is a halogen element.

formula (1)

Embodiments relate to a carbon dioxide separation and recovery system and a carbon dioxide absorbent which recover carbon dioxide etc. in an exhaust gas generated from an energy plant or a chemical plant using raw materials and fuels mainly composed of hydrocarbons in a coal thermal power generation plant, an exhaust gas generated from an automobile etc., a raw material gas, or a fuel gas.

On the other hand, when a solid carbon dioxide absorbent with an absorbent liquid component carried on a solid is used, energy involved in heating of extra moisture existing in an aqueous solution system during desorption and regeneration of carbon dioxide can be reduced, and therefore an energy saving carbon dioxide recovery technique is attained.

Hereinafter, the present embodiments will be described in detail.

Embodiment 1

(Carbon Dioxide Absorbent)

A carbon dioxide absorbent in embodiment 1 contains a resin compound containing a structural unit expressed by formula (1) in FIG. 1. FIG. 1 shows chemical structural formulae of units contained in the carbon dioxide absorbent according to the embodiment. The resin compound is an organic substance expressed by $C_\alpha H_\beta N_\gamma O_\delta X_\epsilon$. X is a halogen element, each of $\alpha$, $\beta$, $\gamma$ and $\epsilon$ is a natural number, and $\delta$ is 0, or a natural number.

The carbon dioxide absorbent according to embodiment 1 is a resin compound containing the structural unit of formula (1), and the resin compound contains an amino group having a carbon dioxide absorbing ability and a carbon dioxide releasing ability. A resin compound having a polyamine structure having a carbon dioxide absorbing ability and a carbon dioxide releasing ability is preferable. As a resin structure of the resin compound, a polyvinyl halide structure is preferable. The structure of formula (1) expresses a substructure of a structure in which a polyvinyl halide structure and a polyamine structure are connected. The resin compound contained in the carbon dioxide absorbent according to embodiment 1 is a solid carbon dioxide absorbent. The solid means a material which is not melted, or dissolved in a carbon dioxide absorbent liquid in a carbon dioxide absorption process at 1 atm and 20° C. or higher and 100° C. or lower.

When the resin compound contains a large number of amino groups, the absorption amount of carbon dioxide increases, and therefore it is preferable that the resin compound includes a polyamine structure. From the viewpoint of oxidation resistance of the resin compound, it is preferable that the resin compound has a polyvinyl halide structure. Since the resin compound is not a compound which is subjected to a reaction with a silane coupling agent, the compound does not include a Si—O structure, and therefore has high aqueous solution resistance. By combining the polyamine structure and the polyvinyl halide structure, durability and the absorption and release amount of carbon dioxide are improved. The structure in the resin compound containing a unit of formula (1) is shown in formula (2) in FIG. 1.

The left-side part of the structure of the resin compound of formula (2) expresses a polyvinyl halide structure. The right-side part of the structure of the resin compound (2) expresses a polyamine structure. In the resin compound (2), both of the polyvinyl halide structure and the polyamine structure are included. In the resin compound, the polyvinyl halide structure and the polyamine structure are connected. A plurality of polyvinyl halide structures exist, and have a polymer structure.

1 (e11) in the polyvinyl halide structure is a natural number. X in the vinyl halide is a halogen element. X in the vinyl halide is preferably at least one selected from the group consisting of: Br, Cl and F. X in the vinyl halide is more preferably Cl from the viewpoint of cost. Preferably, 1 (e11), which is the number of repeating units in the polyvinyl halide structure, satisfies $1 \leq l \leq 5000$. It is not preferable that 1 is larger than 5000 because handling becomes difficult and durability is reduced, leading to deterioration of operability.

One or both of Y and Z in the polyamine structure include(s) an organic group containing a polyamine. The polyamine structure includes a plurality of amino groups. Y and Z in the polyamine structure are organic groups containing one of an alkyl group including hydrogen and carbon, an alkyl group substituted with an amino group, and an alkyl group partially substituted with a hydroxyl group. Preferably, the organic group containing an alkyl group substituted with an amino group has an organic group containing a polyamine having an alkyl group substituted with an amino group as a repeating structure. The polyamine structure includes a polyamine substructure expressed by where $W_m$ is a repeating unit, and m (m1, m2) is the number of repeating units. The amine contained in the polyamine structure is preferably a primary amine, a secondary amine, or one of a primary amine and a secondary amine.

Preferably, the polyamine structure includes at least one substructure $W_m$ selected from the group consisting of: —$((CH_2)_{m1}$—$NH)_{m2}$—, —$(CH_2(CH_3)_{m1}$—$NH)_{m2}$—, —$((CH_2CH(CH_3))_{m1}$—$NH)_{m2}$—, —$((CH_2)_{m1}$—$C_5H_8$—$NH)_{m2}$—, —$((CH_2)_{m1}$—$C_6H_{10}$—$NH)_{m2}$—, —$((CH_2)_{m1}$—$C_6H_4$—$NH)_{m2}$—, —$CH[(CH_2)_m NH$—$]_2$, —$((NH$—$CH_2CH_2)_{m1}$—$NH)_{m2}$—, —$(CH_2CH(CH_2OH)$—$NH)_m$—, —$(CH_2CH(CH_2CH_2OH)$—$NH$—$)_m$, —$(CH_2C(CH_3)(CH_2OH)$—$N)_m$— and —$((CH_2)_{m1}$—$NH$—$CH(CH_3))_{m2}$— for improving the reaction rate of absorption and release of carbon dioxide. The terminal of the main chain in the polyamine structure is one of hydrogen, methyl group, ethyl group, methanol group, ethanol group and hydroxyl group. The polyamine structure includes one or more partial substructures.

The polyamine structure may further include a heterocyclic amine of —CH—$(CH_2CH_2)_2$—N— or —N—$(CH_2CH_2)_2$—N—.

It is preferable that in the polyamine structure, m (or m1×m2) which is the number of repeating units satisfies $1 \leq m$ (m1×m2) $\leq 10000$. It is not preferable that m (or m1×m2) is more than 10000 because the reactivity between amine and $CO_2$ is reduced. When there are at plurality of kinds of polyamine substructures, the sum of the numbers of repeating units in the polyamine substructures is defined as the number of repeating units in the polyamine structure.

A more specific structure of the resin compound according to the embodiment is shown in formula (3) in FIG. 1. The resin compound shown in formula (3) is different from the resin compound of formula (2) in that the structure of the resin compound of formula (3) further includes an organic group having an alkanolamine structure, and the polyvinyl halide structure and the polyamine structure are connected through an organic group having an alkanolamine structure.

The number n of repeating units in the organic group having an alkanolamine structure is preferably 0 or more and 10 or less. It is not preferable that n is more than 10 because oxidative degradation easily occurs. The resin compound is not required to contain the organic group having an alkanolamine structure. In other words, n may be 0.

The repeating structure having o (oh) repeating units includes a polyamine substructure expressed by Wm. The number o of repeating units is 1 or more. When o is 2 or more, the resin compound contains a plurality of polyamine substructures expressed by Wm.

It is preferable that in the polyamine structure, m×o (or m1×m2×o) which is the number of repeating units satisfies $1 \leq m$ (m1×m2) $\leq 10000$. It is not preferable that m (or m1×m2) is more than 10000 because the reactivity between amine and $CO_2$ is reduced.

From the viewpoint of carbon dioxide absorption efficiency, the terminal of the main chain in the carbon dioxide absorbent according to the embodiment is preferably a primary amine.

The polyamine structure has one or more polyamine substructures. In the case of two or more polyamine substructures, one polyamine structure includes two or more polyamine substructures.

The carbon dioxide absorbent may have a structure in which a resin compound is provided on a metal support or a resin support of polystyrene, polypropylene or the like.

The carbon dioxide absorbent may be a mixture containing two or more resin compounds. In the case of different kinds of resin compounds, a single carbon dioxide absorbent may include a mixture containing two or more resin compounds, or a plurality of kinds of single carbon dioxide absorbents containing different resin compounds may be included.

Using an analysis method such as FT-IR (Fourier Transform Infrared Spectroscopy), solid-state NMR, direct introduction type mass spectrometry (mass spectrometry using DART (Direct Analysis in Real Time), or ASAP (Atmospheric Pressure Solid Analysis Probe)) or the like, it is determined that an amine in a solid carbon dioxide absorbent contains a primary amine, a secondary amine or a tertiary amine. As a more specific analysis method, the peak of H attributed to H combined with nitrogen in the primary amine, the secondary amine and the tertiary amine can be observed by 1H-NMR to determine the series of the amine in the polyamine substructure.

The solid carbon dioxide absorbent may contain a third component other than the above-mentioned components in order to improve stability, wettability and the like.

The nitrogen atom concentration in the total mass of the solid resin compound is preferably 0.1% by mass or more and 20% by mass or less. When the nitrogen atom concentration is 0.1 mass % or less, sufficient carbon dioxide absorption performance cannot be obtained. On the other hand, when the nitrogen element concentration is 20 mass % or more, sufficient physical strength cannot be obtained.

The nitrogen atom concentration (mass percentage) in the total mass of the solid resin compound is determined by measuring the absorbent before absorption of carbon dioxide using an elemental analysis method, a total nitrogen measuring apparatus or a chemiluminescent nitrogen detector.

The mass (g) of the nitrogen element in the total mass of the resin compound is determined by measuring the absorbent before absorption of carbon dioxide using an elemental analysis method.

The carbon dioxide absorbent, may further contain a carbon dioxide absorbent liquid. The carbon dioxide absorbent liquid contains an amine solution and a solvent. A solid resin compound may be used alone, but by combining it with a carbon dioxide absorbent liquid, a carbon dioxide absorbent capable of efficiently absorbing carbon dioxide, and releasing carbon dioxide with low energy can be provided.

The carbon dioxide absorbent liquid is preferably a solution containing a liquid amine and a solvent. Here, the liquid state means that the amine is liquid at 1 atm and 20° C. Preferably, the liquid amine contains an aliphatic amine, a heterocyclic amine, or both an aliphatic amine and a heterocyclic amine. Preferably, the amine solvent contains at least water. The amine may include at least one amine. The amine included in the amine is dissolved in water. As the solvent, water and a solvent compatible with water are preferable.

For reducing the amount of energy during desorption of carbon dioxide, it is preferable that the amine in the carbon dioxide absorbent liquid has at least one primary amine, secondary amine, or tertiary amine. The amine in the carbon dioxide absorbent liquid is preferably a hindered amine. It is more preferable that among the amines in the carbon dioxide absorbent liquid, the primary amine, the secondary amine or the tertiary amine is a hindered amine. The hindered amine is a compound in which at least one of the functional groups (for example, a carbon chain) combined with nitrogen in the amine is a carbon chain, and the carbon chain is branched.

The primary amine in the amines in the carbon dioxide absorbent liquid may nave a plurality of kinds of amine structures. The secondary amine in the amines in the carbon dioxide absorbent liquid may have a plurality of kinds of amine structures. The tertiary amine in the amines in the carbon dioxide absorbent liquid may have a plurality of kinds of amine structures. The term "a plurality of kinds of amine structures" mentioned here encompasses both a plurality of kinds of amine structures included in one kind of amine and a mixture of a plurality of kinds of amine compounds.

The aliphatic amine and the heterocyclic amine contained in the amine in the carbon dioxide absorbent liquid are expressed by the chemical formula of R1R2—N—R3. R1, R2 and R3 are ail combined with a nitrogen atom. In the case of the heterocyclic amine, R2 and R3 are combined to form a cyclic amine containing nitrogen.

R1 contains at least hydrogen (H), and may contain carbon (C), R1 may further contain oxygen (O), nitrogen (N), or oxygen (O) and nitrogen (N). R1 is hydrogen, or a functional group expressed by $C_{s1}H_{t1}O_{u1}N_{v1}$ when expressed by a chemical formula. It is preferable that s1, t1, u1 and v1 satisfy $0 \leq s1 \leq 20$, $1 \leq t1 \leq 50$, $0 \leq u1 \leq 10$, and $0 \leq v1 \leq 5$, respectively. It is not preferable that R1 has an excessively large molecular structure because the hydration property of the amine is reduced, and the viscosity is increased. Therefore, an amine satisfying the above conditions is preferable. Thus, it is more preferable that s1, t1, u1 and v1 satisfy $0 \leq s1 \leq 10$, $1 \leq t1 \leq 25$, $0 \leq u1 \leq 5$, and $0 \leq v1 \leq 4$, respectively.

R2 contains at least hydrogen (H), and may contain carbon (C). R2 may further contain oxygen (O), nitrogen (N), or oxygen (O) and nitrogen (N). R2 is hydrogen, or a functional group expressed by $C_{s2}H_{t2}O_{u2}N_{v2}$ when expressed by a chemical formula. It is preferable that s2, t2, u2 and v2 satisfy $0 \leq s2 \leq 20$, $1 \leq t2 \leq 50$, $0 \leq u2 \leq 10$, and $0 \leq v2 \leq 5$, respectively. It is not preferable that R2 has an excessively large molecular structure because the hydration property of the amine is reduced, and the viscosity is increased. Therefore, an amine satisfying the above conditions is preferable. Thus, it is more preferable that s2, t2, u2 and v2 satisfy $0 \leq s2 \leq 20$, $1 \leq t2 \leq 25$, $0 \leq u2 \leq 5$, and $0 \leq v2 \leq 4$, respectively.

R3 contains at least hydrogen (H) and carbon (C). R3 may further contain oxygen (O), nitrogen (N), or oxygen (O) and nitrogen (N). R3 is hydrogen, or a functional group expressed by $C_{s3}H_{t3}O_{u3}N_{v3}$ when expressed by a chemical formula. It is preferable that s3, t3, u3 and v3 satisfy $1 \leq s3 \leq 20$, $1 \leq t3 \leq 50$, $0 \leq u3 \leq 10$, and $0 \leq v3 \leq 5$, respectively. It is not preferable that R3 has an excessively large molecular structure because the hydration property of the amine is reduced, and the viscosity is increased. Therefore, an amine satisfying the above conditions is preferable. Thus, it is more preferable that s3, t3, u3 and v3 satisfy $1 \leq s3 \leq 10$, $1 \leq t3 \leq 25$, $0 \leq u3 \leq 5$, and $0 \leq v3 \leq 4$, respectively.

Specific examples of amines in the carbon dioxide absorbent liquid include the following compounds. The first amine is preferably at least one amine selected from the group consisting of: monoethanolamine, 2-amino-1-propanol, 3-amino-1-propanol, 1-amino-2-propanol, 2-amino-1-butanol, 3-amino-1-butanol, 4-amino-1-butanol, 2-amino-2-methyl-1-propanol, 2-amino-2-ethyl-1-propanol, ethylenediamine, propylenediamine, 1-propylamine, 2-propylamine, 2-methylaminoethanol, 2-ethylaminoethanol, diethanolamine, hydroxyethylhydroxypropylamine, dipropanolamine, isopropylaminoethanol, 3-methylamine-1,2-propanediol, diethylamine, methylethylamine, dipropylamine, cyclopentylaminoethanol, cyclohexylaminoethanol, dimethylaminoethanol, diethylaminoethanol, N-methyldiethanolamine, triethanolamine, 3-(dimethylamino)-1,2-propanediol, 2-{[2-(dimethylamino) ethyl] methylamino}ethanol, N,N,N', N'-tetramethylethylethylenediamine, N-methyl-cycohexylaminoethanolpiperidine, piperazine, 1-methylpiperazine, 2-methylpiperazine, 1,4-dimethylpiperazine, 1-methylpyrrolidine, 2-methylpyrrolidine, 1,4-diazabicyclo[2,2,2]octane and morpholine.

Specific examples of primary amines, secondary amines and tertiary amines include the following compounds. Preferably, the first amine according to the embodiment includes at least one amine selected from the group consisting of: 2-amino-2-methyl-1-propanol, isopropylaminoethanol, N-t-butylaminoethanol, cyclohexylaminoethanol, cyclopentylaminoethanol, dimethylaminoethanol, diethylaminoethanol, N-methyldiethanolamine, triethanolamine, N-methylcyclopentylaminoethanol, N-ethylcyclopentylaminoethanol, 3-(dimethylamino)-1,2-propanediol, 2-{[2-(dimethylamino) ethyl]methylamino}ethanol, N,N,N',N'-tetramethylethylenediamine, N-methyl-cyclohexylaminoethanol and N-ethylcyclohexylaminoethanol.

From the viewpoints of viscosity, vapor pressure and the like, at least one amine selected from the group consisting of: 2-amino-2-methyl-1-propanol, isopropylaminoethanol, N-t-butylaminoethanol, cyclohexylaminoethanol, cyclopentylaminoethanol, dimethylaminoethanol, diethylaminoethanol, N-methyldiethanolamine, triethanolamine. N-methylcyclopentylaminoethanol, N-ethylcyclopentylaminoethanol, N-methyl-cyclohexylaminoethanol and N-ethylcyclohexylaminoethanol.

The total amount of amine (the amount of liquid amine) contained in the carbon dioxide absorbent liquid containing an amine and a solvent is preferably 20 mass % or more and 80 mass % or less. It is not preferable that the total amount of amine contained in the carbon dioxide absorbent liquid is less than 20 mass % because sufficient carbon dioxide absorption performance cannot be obtained. It is not preferable that the total amount of amine contained in the carbon dioxide absorbent liquid is higher than 80 mass % because the viscosity is increased to deteriorate operability, and absorption performance is deteriorated, so that a sufficient effect cannot be obtained. From the same viewpoint, the total amount of amine contained, in the carbon dioxide absorbent liquid is more preferably 30 mass % or more and 70 mass % or less. When a mixed absorbent of two or more amines and water is used, mixing of amines can be carried out at an arbitrary ratio within the above-mentioned preferable amine concentration range. The methods for quantitative determination and qualitative determination of the total amine contained in the carbon dioxide absorbent liquid is not particularly limited as long as the amine can be quantitatively and qualitatively analyzed, and HPLC (High Performance Liquid Chromatography), LC/MS (Liquid Chromatography/Mass Spectrometry), LC/MS/MS (Liquid Chromatography/Tandem Mass Spectrometry), LC/TOF-MS (Liquid Chromatography/Time-of-flight mass spectrometry), GC/MS (Gas Chromatography/Mass Spectrometry ). GC/MS/MS (Gas Chromatography/Tandem Mass Spectrometry), GC/TOF-MS (Gas Chromatography/Time-of-flight mass spectrometry), IC(Ion Chromatography), IC/MS (Ion Chromatography/Mass Chromatography )1H-NMR (1H Nuclear Magnetic Resonance), 13C-NMR (13C Magnetic Resonance) or the like can be used.

The carbon dioxide absorbent liquid may contain a third component other than the above-mentioned components, such as a degradation suppressing agent other than the above-mentioned agents, a defoaming agent, a viscosity adjusting agent or an antioxidant.

Embodiment 2

(Carbon Dioxide Absorbent)

The resin compound of the carbon dioxide absorbent in embodiment 2 is the same as the carbon dioxide absorbent in embodiment 1 except that the resin compound further includes a polypropylene structure of formula (4) in FIG. 1. A polyvinyl halide structure is preferably present between a polypropylene structure and a polyamine structure. The polyvinyl halide according to embodiment 2 is preferably a copolymer of polypropylene and polyvinyl halide. The number of repeating units in the polypropylene structure is expressed by p.

The carbon dioxide absorbent in embodiment 2 contains a resin compound containing a structural unit expressed by formula (1) and a polypropylene structure expressed by formula (4) in FIG. 1. The resin compound is an organic substance expressed by $C_\alpha H_\beta N_\gamma O_\delta X_\varepsilon$. X is a halogen element, each of $\alpha$, $\beta$, $\gamma$ and $\varepsilon$ is a natural number, and $\delta$ is 0, or a natural number.

The carbon dioxide absorbent according to embodiment 2 is a resin compound containing the structural unit of formula (1), and the resin compound contains an amino group having a carbon dioxide absorbing ability and a carbon dioxide releasing ability. A resin compound having a polyamine structure having a carbon dioxide absorbing ability and a carbon dioxide releasing ability is preferable. As a resin structure of the resin compound, a copolymer of a polyvinyl halide structure and a polypropylene structure is preferable. The structure of formula (1) expresses a substructure of a structure in which a polyvinyl halide structure and a polyamine structure are connected. The polyvinyl halide structure has water resistance, but its heat resistance is not so nigh. For improving heat resistance of the carbon dioxide absorbent, it is preferable that the carbon dioxide absorbent further contains a polypropylene structure in the resin compound.

The copolymer of a polyvinyl halide structure and a polypropylene structure is preferably a block copolymer having a polyvinyl halide structure on the polyamine structure side as shown in formula (5) in. FIG. 1. The repeating unit structure in the polypropylene structure is a propylene structure.

For improving heat resistance of the resin compound, it is preferable that the resin compound contains a large amount of the polypropylene structure. Specifically, the mass ratio of the polypropylene structure in the resin compound is preferably 50% or more and 39% or less. The mass ratio of the polypropylene structure in the resin compound is determined by a method such as infrared spectroscopy, thermal decomposition GC/MS (Gas Chromatography-Mass spectrometry), an elemental analysis method or the like. The mass (g) of the nitrogen element in the total mass of the resin compound is determined by measuring the absorbent before absorption of carbon dioxide using an elemental analysis method.

When the polyvinyl halide structure is sandwiched between the polypropylene structure and the polyamine structure, the polypropylene structure is present at the center of the resin compound, and the polyamine structure is present on the surface side of the resin compound. The polyvinyl halide structure is present between the polypropylene structure at the center and the polyamine structure on the surface. Since the polypropylene structure excellent in heat resistance is present at the center, the polypropylene structure part serves as a nucleus of the resin compound, resulting in contribution to improvement of heat resistance of the resin compound. Even when a part of the resin compound contains a random copolymer structure of a polyvinyl halide structure and a polypropylene structure, heat resistance of the resin compound can be improved. Preferably, the resin compound according to embodiment 2 has a polypropylene structure as a core, and a two-layer shell structure of a polyvinyl chloride structure and a polyamine structure. Such a structure is preferable from the viewpoint of repeated use because of its high durability against heating during release of carbon dioxide.

Embodiment 3

(Method for Separation and Recovery of Carbon Dioxide and System for Separation and Recovery of Carbon Dioxide)

Embodiment 3 relates to a method for separation and recovery of carbon dioxide and a system for separation and recovery of carbon dioxide using a carbon dioxide absorbent which contains the solid resin compound according to embodiment 1 or 2 and which does not contain a carbon dioxide absorbent liquid.

The carbon dioxide separation and recovery method and the carbon dioxide separation and recovery system according to embodiment 3 will be described. The carbon dioxide separation and recovery method according to the embodiment is an example of a method for separation and recovery of carbon dioxide using the carbon dioxide absorbent according to the embodiment. The carbon dioxide separation and recovery system according to the embodiment is an example of an apparatus that carries out the carbon dioxide separation and recovery method according to the embodiment.

The carbon dioxide separation and recovery system according to embodiment 3 includes a carbon dioxide absorbent containing a solid resin compound; an absorption and regeneration tower in which a carbon dioxide-containing gas to be treated is introduced, carbon dioxide is absorbed into the solid resin compound, and the solid resin compound absorbing carbon dioxide is heated to release carbon dioxide from the solid resin compound; and a recovery tower in which the released carbon dioxide is recovered.

The carbon dioxide separation and recovery method according to embodiment 3 includes absorbing carbon dioxide into a solid resin compound by introducing a carbon dioxide-containing gas to be treated into an absorption and regeneration tower containing a carbon dioxide absorbent containing the solid resin compound (first step); releasing carbon dioxide by heating the solid resin compound absorbing carbon dioxide (second step); and recovering the released carbon dioxide (third step). By carrying out the first and second steps, carbon dioxide can be repeatedly recovered. These steps can be carried out continuously.

The absorption and regeneration tower is a tower that absorbs carbon dioxide. In the absorption and regeneration tower, a solid resin compound is contained. In the absorption and regeneration tower, carbon dioxide is absorbed into a solid resin compound by introducing a carbon dioxide-containing gas to be treated into the absorption and regeneration tower containing a carbon dioxide absorbent containing the solid resin compound. A carbon dioxide-containing gas to be treated is introduced into the absorption and regeneration tower, and carbon dioxide is absorbed by a solid resin compound in the absorption and regeneration tower. The absorption and regeneration tower may contain a filler or the like composed of a resin or a metal as long as it contains a solid resin compound. Preferably, the solid resin compound is contained in or fixed to the absorption and regeneration tower.

The method for bringing the solid resin compound into contact with a carbon dioxide-containing gas to be treated in the absorption and regeneration tower is not limited to the above-mentioned method as long as the carbon dioxide-containing gas to be treated can be brought into contact with the solid resin compound, and examples thereof include a method in which the gas to be treated is fed to the solid resin compound. The solid resin compound and carbon dioxide are brought into contact with each other to allow the resin compound in the solid resin compound to react with carbon dioxide.

The temperature of the carbon dioxide absorption and reaction atmosphere in the absorption and regeneration tower (temperature of the solid resin compound in the absorption and regeneration tower) may be any temperature as long as the solid resin compound can absorb carbon dioxide, but it is preferably 10° C. or more and less than 70° C. from the viewpoint of absorption efficiency. The reaction rate decreases at low temperature, and the absorption performance decreases at high temperature. Temperature control of the gas to be treated or solid resin compound may be carried out as necessary so as to attain this temperature. Preferably, the suitable temperature is changed according to a carbon dioxide absorbent used.

Introduction of the gas to be treated into the absorption and regeneration tower is stopped, and the temperature of the solid resin compound in the absorption and regeneration tower is elevated to release carbon dioxide from the solid resin compound which has absorbed carbon dioxide. In heating, the solid resin compound may be heated, or heated steam may be introduced into the absorption and regeneration tower.

The temperature at which carbon dioxide is released in the absorption and regeneration tower (temperature of the solid resin compound) maybe any temperature as long as carbon dioxide can be released, but it is preferably 70° C. or more and 150° C. or less from the viewpoint of release efficiency. Preferably, the suitable temperature is changed according to a carbon dioxide absorbent used. It is also possible to carry out a decompression operation and a film separation operation in addition to a heating operation during release of carbon dioxide.

Preferably, the carbon dioxide separation and recovery system includes two or more absorption and regeneration towers. When a plurality of absorption and regeneration towers are provided, carbon dioxide can be separated and recovered continuously by performing absorption of carbon dioxide and release of carbon dioxide in separate absorption and regeneration towers respectively.

Examples of the carbon dioxide-containing gas to be treated include exhaust gases and air (for example, air with the carbon dioxide concentration increased due to expiration etc.) associated with combustion, such as exhaust gases from thermal power plants, exhaust gases from blast furnaces and exhaust gases from converters. The concentration of carbon dioxide in the gas to be treated is not particularly limited, but it may be typically about 0.1 to 30 vol %, preferably about 10 to 20 vol % . The gas to be treated may contain impurity gases derived from a source, such as water vapor or carbon monoxide, in addition to carbon dioxide.

In the recovery tower, carbon dioxide may be recovered as a gas, or may be cooled to be recovered as solid carbon dioxide, or may be reformed into a hydrocarbon such as methane using a catalyst, and recovered. The purity of recovered carbon dioxide is 90% or more. This high-concentration carbon dioxide is used as a raw material for synthesis of a compound, a raw material for synthesis of a fuel such as methane or methanol, or a raw material for photosynthesis in greenhouse cultivation. In addition, recovered carbon dioxide can be store underground. The carbon dioxide absorbent according to embodiment 1 or embodiment 2 contributes to suppression of greenhouse gas emission by recovering carbon dioxide with low energy.

Embodiment 4

(Method for Separation and Recovery of Carbon Dioxide and System for Separation and Recovery of Carbon Dioxide)

Embodiment 4 relates to a method for separation and recovery of carbon dioxide and a system for separation and recovery of carbon dioxide using a carbon dioxide absorbent containing the solid resin compound according to embodiment 1 or 2, and a carbon dioxide absorbent liquid.

The carbon dioxide separation and recovery method and the carbon dioxide separation and recovery system according to embodiment 4 will be described. The carbon dioxide separation and recovery method according to the embodiment is an example of a method for separation and recovery of carbon dioxide using the carbon dioxide absorbent according to the embodiment. The carbon dioxide separation and recovery system according to the embodiment is an example of an apparatus that carries out the carbon dioxide separation and recovery method according to the embodiment.

The carbon dioxide separation and recovery system according to embodiment 4 includes a carbon dioxide absorbent containing a solid resin compound and a carbon dioxide absorbent liquid; an absorption tower in which a carbon dioxide-containing gas to be treated is introduced, and carbon dioxide is absorbed into the solid resin compound and the carbon dioxide absorbent liquid; a regeneration tower in which carbon dioxide is released from the carbon dioxide absorbent liquid absorbing carbon dioxide; and a recovery tower in which the released carbon dioxide is recovered.

The carbon dioxide separation and recovery method according to embodiment 4 includes absorbing carbon dioxide into a solid resin compound and a carbon dioxide absorbent liquid by introducing a carbon dioxide-containing gas to be treated into an absorption tower containing a carbon dioxide absorbent containing the solid resin compound and the carbon dioxide absorbent liquid (first step); moving to a regeneration tower the carbon dioxide absorbent liquid absorbing carbon dioxide (second step); releasing carbon dioxide from the carbon dioxide absorbent liquid moved to the regeneration tower and absorbing carbon dioxide (third step); moving to an absorption tower the carbon dioxide absorbent liquid from which carbon dioxide is released (fourth step); and recovering the released carbon dioxide (fifth step). Subsequently to the fourth step, the first step is carried out, so that carbon dioxide can be repeatedly recovered. These steps can be carried out continuously.

In releasing of carbon dioxide, the solid carbon dioxide absorbent is not moved to the regeneration tower because it is contained in the absorption tower. The solid carbon dioxide absorbent is held in the absorption tower, and further, the liquid carbon dioxide absorbent and the solid carbon dioxide absorbent according to the embodiment are used, so that the energy required for releasing and recovering carbon dioxide in the regeneration tower can be considerably reduced.

The absorption tower is a column that absorbs carbon dioxide. In the absorption tower, a solid resin compound and a carbon dioxide absorbent liquid are contained. Preferably, a mixture of a solid resin compound and a carbon dioxide absorbent liquid is contained in the absorption tower. In the absorption tower, carbon dioxide is absorbed into a solid resin compound and a carbon dioxide absorbent liquid by introducing a carbon dioxide-containing gas to be treated into the absorption tower containing a carbon dioxide absorbent containing the solid resin compound and the carbon dioxide absorbent liquid. A carbon dioxide-containing gas to be treated is introduced into the absorption tower, and carbon dioxide is absorbed by a solid resin compound and a carbon dioxide absorbent liquid in the absorption tower. The absorption tower may contain a filler or the like composed of a resin or a metal as long as it contains a solid resin compound and a carbon dioxide absorbent liquid. When the carbon dioxide absorbent liquid is moved between the absorption tower and the regeneration tower, the solid resin compound remains in the absorption tower. Therefore, it is preferable that the solid resin compound is contained in or fixed to the absorption tower. In such a mode, the solid resin compound is in contact with the carbon dioxide absorbent liquid, and therefore carbon dioxide is favorably absorbed.

The solid resin compound in the absorption tower, the carbon dioxide absorbent liquid and the carbon dioxide-containing gas to be treated are brought into contact with one another by, for example, a method in which a gas is bubbled into a carbon dioxide absorbent liquid; a method in which a carbon dioxide absorbent liquid is sprayed into a gas flow in a mist form (atomization or spraying method); or a method in which a carbon dioxide-containing gas and a carbon dioxide absorbent liquid are brought into contact with each other in a countercurrent manner, but a method other than the above-mentioned method may be employed as long as the solid resin compound in the absorption tower, the carbon dioxide absorbent liquid and the carbon dioxide-containing gas to be treated can be brought into contact with one another.

The temperature of the carbon dioxide absorption and reaction atmosphere in the absorption tower (temperature of the carbon dioxide absorbent liquid) may be any temperature as long as the carbon dioxide absorbent can absorb carbon dioxide, but it is preferably 10° C. or more and less than 70° C. from the viewpoint of absorption efficiency. The reaction rate decreases at low temperature, and the absorption performance decreases at high temperature. Temperature control of the gas to be treated or carbon dioxide absorbent may be carried out as necessary so as to attain this temperature. Preferably, the suitable temperature is changed according to a carbon dioxide absorbent used.

The regeneration tower is a tower that releases carbon dioxide from the carbon dioxide absorbent liquid that has absorbed carbon dioxide. Carbon dioxide is recovered by releasing carbon dioxide in the regeneration tower. Processes such as storage, transportation and utilization of recovered carbon dioxide may be performed. Carbon dioxide is released from the carbon dioxide absorbent liquid that has absorbed carbon dioxide moved to the regeneration tower. Preferably, the carbon dioxide absorbent liquid is heated for releasing carbon dioxide. The carbon dioxide absorbent liquid moved to the regeneration tower is heated to releases carbon dioxide.

The temperature at which carbon dioxide is released in the regeneration tower (temperature of the carbon dioxide absorbent liquid) may be any temperature as long as carbon dioxide can be released, but it is preferably 70° C. or more and 150° C. or less from the viewpoint of release efficiency. Preferably, the suitable temperature is changed according to a carbon dioxide absorbent liquid used. It is also possible to carry out a decompression operation and a film separation operation in addition to a heating operation during release of carbon dioxide.

The carbon dioxide absorbent liquid that has released carbon dioxide in the regeneration tower is returned to the absorption tower again, and used for absorbing carbon dioxide. In this way, absorption and release of carbon dioxide can be repeatedly performed with low energy.

The recovery tower and the gas to be treated in embodiment 4 are the same as the recovery tower and the gas to be treated in embodiment 3.

Example 1

<Preparation of Solid Carbon Dioxide Gas Absorbent>

To a particulate vinyl chloride resin was added pentaethylenehexamine (PEHA) as an amine at a mass ratio of 1:2, the mixture was stirred at 60° C. while being aerated with nitrogen, and the vinyl chloride resin was loaded with the amine to prepare a solid carbon dioxide gas absorbent. The PEHA loading amount was 2.6 mass % in terms of a N concentration.

<Preparation of Moisture Degradation Simulated Solid Carbon Dioxide Gas Absorbent>

The solid carbon dioxide gas absorbent was dispersed in pure water, and stored at 60° C. for 10 days. The dispersion was filtered and dried to obtain a moisture degradation simulated solid carbon dioxide gas absorbent. The residual amount of PEHA was 2.6 mass % in terms of a N concentration.

<Preparation of Thermal Degradation Simulated Solid Carbon Dioxide Gas Absorbent>

The solid carbon dioxide gas absorbent was heated at 150° C. for 1 hour to obtain a thermal degradation simulated solid carbon dioxide gas. The solid carbon dioxide gas absorbent after heating was in the form of fused particles. The residual amount of PEHA was 2.4 mass % in terms of a N concentration, <$CO_2$ Absorption/Release Test>

A gas containing about 10 vol % of $CO_2$ gas was absorbed into the solid carbon dioxide gas absorbent at a flow rate of 0.1 L/min for about 3 hours under the atmospheric pressure condition at 40° C. to absorb $CO_2$. The $CO_2$ recovery amount at 150° C. was analyzed under the thermal decomposition condition of 150° C. and 1 minute using a pyrolysis gas chromatograph/mass spectrometer under, and the result showed that the $CO_2$ recovery amount was 0.6 g/kg (no degradation). For the moisture degradation simulated solid carbon dioxide gas absorbent, a $CO_2$ absorption/release test was conducted in the same manner as described above, and the result showed that the $CO_2$ recovery amount was 0.50 g/kg (water degradation). For the thermal degradation simulated solid carbon dioxide gas absorbent, a $CO_2$ absorption/release test was conducted in the same manner as described above, and the result showed that the $CO_2$ recovery amount was 0.30 g/kg (thermal degradation).

Example 2

Except that polyethyleneimine was used as an amine, the same procedure as in Example 1 was carried out to prepare a solid carbon dioxide gas absorbent, a moisture degradation simulated solid carbon dioxide gas absorbent and a thermal degradation simulated solid carbon dioxide gas absorbent, and the $CO_2$ absorption amount and the $CO_2$ release amount were evaluated. The polyethyleneimine loading amount of the solid carbon dioxide gas absorbent was 2.3 mass % in terms of a N concentration, and the $CO_2$ recovery amount was 1.7 g/kg. The polyethyleneimine loading amount of the moisture degradation simulated solid carbon dioxide gas absorbent was 2.3 mass % in terms of a N concentration, and the $CO_2$ recovery amount was 1.9 g/kg. The polyethyleneimine loading amount of the thermal degradation simulated solid carbon dioxide gas absorbent was 2.1 mass % in terms of a N concentration, and the $CO_2$ recovery amount was 1.1 g/kg.

Example 3

PP Base Solid Absorbent

A chlorine gas was blown into a particulate polypropylene resin in 1,2-dichloroethane with stirring at 50° C., and the mixture was subjected to filtration, washing with methanol and vacuum drying to obtain a particulate chlorine-containing polypropylene resin which was chlorinated at a part of a surface and had a chlorine content of 10%. Except that the particulate chlorine-containing polypropylene resin was used in place of the particulate vinyl chloride resin, the same procedure as in Example 2 was carried out to prepare a solid carbon dioxide gas absorbent, a moisture degradation simulated solid carbon dioxide gas absorbent and a thermal degradation simulated solid carbon dioxide gas absorbent, and the $CO_2$ absorption amount and the $CO_2$ a release amount were evaluated. The polyethyleneimine loading amount of the solid carbon dioxide gas absorbent was 1.8 mass % in terms of a N concentration, and the $CO_2$ recovery amount was 1.5 g/kg. The polyethyleneimine loading amount of the moisture degradation simulated solid carbon dioxide gas absorbent was 1.8 mass % in terms of a N concentration, and the $CO_2$ recovery amount was 1.5 g/kg. The polyethyleneimine loading amount of the thermal degradation simulated solid carbon dioxide gas absorbent was 1.8 mass % in terms of a N concentration, and the $CO_2$ recovery amount was 1.5 g/kg.

Example 4

The solid carbon dioxide gas absorbent prepared in Example 2 was dispersed in a liquid carbon dioxide gas absorbent of 50 mass % of monoethanolamine (MEA) to obtain a solid-liquid hybrid carbon dioxide gas absorbent. The abundance ratio of the liquid carbon dioxide gas absorbent and the solid carbon dioxide gas absorbent was 20:1 in terms of a mass ratio. The same $CO_2$ absorption and desorption experiment as in Example 1was conducted, and the $CO_2$ recovery amount was evaluated by integrating the $CO_2$ concentrations at the exit of the evaluation apparatus. The $CO_2$ recovery amount was 19 g/kg.

Example 5

The thermal degradation simulated solid carbon dioxide gas absorbent prepared in Example 3 was dispersed in a liquid carbon dioxide gas absorbent of 50 mass % of monoethanolamine (MEA) to obtain a solid-liquid hybrid carbon dioxide gas absorbent. The abundance ratio of the liquid carbon dioxide gas absorbent and the solid carbon dioxide gas absorbent was 20:1 in terms of a mass ratio. The same $CO_2$ absorption and desorption experiment as in Example 1 was conducted, and the $CO_2$ recovery amount was evaluated by integrating the $CO_2$ concentrations at the exit of the evaluation apparatus. The $CO_2$ recovery amount was 16 g/kg.

Comparative Example 1

Except that a commercially available polystyrene-loading amine was used as a solid carbon dioxide gas absorbent, the same procedure as in Example 1 was carried out to prepare a solid carbon dioxide gas absorbent, a moisture degradation simulated solid carbon dioxide gas absorbent and a thermal degradation simulated solid carbon dioxide gas absorbent, and the $CO_2$ absorption amount and the $CO_2$ release amount were evaluated. The solid carbon dioxide gas absorbent after heating was in the form of fused particles. The amine loading amount of the solid carbon dioxide gas absorbent was 9 mass % in terms of a N concentration, and the $CO_2$ recovery amount was 0.9 g/kg. The amine loading amount of the moisture degradation simulated solid carbon dioxide gas absorbent was 3 mass % in terms of a N concentration, and the $CO_2$ recovery amount was 0.4 g/kg. The polyethyleneimine loading amount of the thermal degradation simulated solid carbon dioxide gas absorbent was 1 mass % in terms of a N concentration, and the $CO_2$ recovery amount was 0.1g/kg or less.

Comparative Example 2

Except that a commercially available silica-loading polyethyleneimine was used as a solid carbon dioxide gas absorbent, the same procedure as in Example 1 was carried out to prepare a solid carbon dioxide gas absorbent, a moisture degradation simulated solid carbon dioxide gas absorbent and a thermal degradation simulated solid carbon dioxide gas absorbent, and the $CO_2$ absorption amount and the $CO_2$ release amount were evaluated. The polyethyleneimine loading amount of the solid carbon dioxide gas absorbent was 1.8 mass % in terms of a N concentration, and the $CO_2$ recovery amount was 0.3 g/kg. The polyethyleneimine loading amount of the moisture degradation simulated solid carbon dioxide gas absorbent was 1.2 mass % in terms of a N concentration, and the $CO_2$ recovery amount was 0.1 g/kg. The polyethyleneimine loading amount of the thermal degradation simulated solid carbon dioxide gas absorbent was 1.8 mass % in terms of a N concentration, and the $CO_2$ recovery amount was 0.2 g/kg.

TABLE 1

| | Carbon dioxide recovery amount (g/kg) | | |
|---|---|---|---|
| | No degradation | Moisture degradation | Thermal degradation |
| Example 1 | 0.6 | 0.5 | 0.3 |
| Example 2 | 1.7 | 1.9 | 1.1 |
| Example 3 | 1.5 | 1.5 | 1.5 |
| Example 4 | 19 | — | — |
| Example 5 | 16 | — | — |
| Comparative Example 1 | 0.9 | 0.4 | 0.1 |
| Comparative Example 2 | 0.4 | 0.1 | 0.2 |

The solid carbon dioxide gas absorbent in each of examples showed excellent characteristics after the moisture degradation simulation test, whereas the solid carbon dioxide gas absorbent in each of comparative examples showed marked deterioration in characteristics. This indicates that the amine is not adequately combined with the base in Comparative Example 1, and a silicon-oxygen bond is hydrolyzed by moisture in Comparative Example 2. In particular, the solid carbon dioxide gas absorbent including a particulate chlorine-containing polypropylene resin as a base as shown in each of Examples 3 and 5 maintained excellent characteristics after the thermal degradation test, and this is because polypropylene as a base has excellent heat resistance. When the solid carbon dioxide gas absorbent including polyvinyl chloride as a base as shown in each of Examples 1, 2 and 4 is placed under a 150° C. environment for a long time, it is partially melted to reduce the surface area, but can withstand the 150° C. environment for a short time. On the other hand, it is considered that in the solid carbon dioxide gas absorbent including polystyrene as a base as shown in Comparative Example 1, the base was melted by heating, and the amine which was not adequately combined with the base was volatilized, so that characteristics were markedly deteriorated.

Here, some elements are expressed only by element symbols thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide absorbent comprising a solid resin compound containing a structural unit expressed by the following formula (2), wherein X in the formula (2) is a halogen element, the solid resin compound includes a polyvinyl halide structure and a polyamine structure, and the solid resin compound is not melted, or dissolved at 1 atm and 20° C. or higher and 100° C. or lower, and wherein l in the formula (2) is the number of repeating units in the polyvinyl halide structure, one or both of Y and Z in the polyamine structure include an organic group containing a polyamine, Y and Z in the polyamine structure are organic groups containing one of an alkyl group including hydrogen and carbon, an alkyl group substituted with an amino group, and an alkyl group partially substituted with a hydroxyl group, the polyamine structure includes at least one substructure selected from the group consisting of —$((CH_2)_{m1}$—$NH)_{m2}$—, —$(CH_2(CH_3))_{m1}$—$NH)_{m2}$—, —$((CH_2CH(CH_3))_{m1}$—$NH)_{m2}$—, —$((CH_2)_{m1}$—$C_5H_8$—$NH)_{m2}$—, —$((CH_2)_{m1}$—$C_6H_{10}$—$NH)_{m2}$—, —$((CH_2)_{m1}$—$C_6H_4$—$NH)_{m2}$—, —$CH[(CH_2)_m NH$—$]_2$, —$((NH$—$CH_2CH_2)_{m1}$—$NH)_{m2}$—, —$(CH_2CH(CH_2OH)$—$NH)_m$—, —$(CH_2CH(CH_2CH_2OH)$—$NH$—$)_m$, —$(CH_2C(CH_3)(CH_2OH)$—$N)_m$— and —$((CH_2)_{m1}$—$NH$—$CH(CH_3))_{m2}$—, and a terminal of the main chain in the polyamine structure is one of hydrogen, methyl group, ethyl group, methanol group, ethanol group and hydroxyl group, wherein l in the formula (2)

satisfies 1≤l≤5000, m satisfies 1≤m≤10000 when present, and m1×m2 satisfies 1≤m1×m2≤10000 when present

[formula 2]

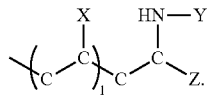

formula (2)

2. The absorbent according to claim 1, wherein the polyvinyl halide structure and the polyamine structure are connected.

3. The absorbent according to claim 1, further comprising an organic group having an alkanolamine structure, wherein the polyvinyl halide structure and the polyamine structure are connected through the organic group having the alkanolamine structure.

4. The absorbent according to claim 1, further comprising a polypropylene structure.

5. The absorbent according to claim 4, wherein the polyvinyl halide structure is present between the polypropylene structure and the polyamine structure.

6. The absorbent according to claim 1, wherein X in the formula (2) is at least one selected from the group consisting of: Br, Cl and F.

7. The absorbent according to claim 1, further comprising a carbon dioxide absorbent liquid, wherein the carbon dioxide absorbent liquid contains a liquid amine and a solvent.

8. A carbon dioxide separation and recovery system comprising:
the carbon dioxide absorbent according to claim 1, which comprises the solid resin compound;
an absorption and regeneration tower in which a carbon dioxide-containing gas to be treated is introduced, the solid resin compound is contained, carbon dioxide is absorbed into the solid resin compound, and the solid resin compound absorbing the carbon dioxide is heated to release carbon dioxide from the solid resin compound; and
a recovery tower in which the released carbon dioxide from the solid resin compound is recovered.

9. A carbon dioxide separation and recovery system comprising:
the carbon dioxide absorbent according to claim 7, which comprises the solid resin compound and the carbon dioxide absorbent liquid;
an absorption tower in which a carbon dioxide-containing gas to be treated is introduced, and carbon dioxide is absorbed into the solid resin compound and the carbon dioxide absorbent liquid;
a regeneration tower in which the carbon dioxide is released from the carbon dioxide absorbent liquid which absorbed the carbon dioxide and is moved from the absorption tower; and
a recovery tower in which the released carbon dioxide is recovered.

* * * * *

UNITED STATES PATENT AND TRADEMARK OFFICE
CERTIFICATE OF CORRECTION

PATENT NO. : 10,722,838 B2  
APPLICATION NO. : 15/699576  
DATED : July 28, 2020  
INVENTOR(S) : Asato Kondo et al.

Page 1 of 1

It is certified that error appears in the above-identified patent and that said Letters Patent is hereby corrected as shown below:

On the Title Page

Item (74), in the Attorney, Agent, or Firm, Line 2, change "Garett" to --Garrett--.

In the Claims

Claim 1, Column 16, Line 47, change "wherein I" to --wherein l--.

Claim 1, Column 16, Line 67, change "wherein 1" to --wherein l--.

Claim 1, Column 17, Line 1, change "$1 \leq 1 \leq 5000$," to --$1 \leq l \leq 5000$,--.

Signed and Sealed this  
Fifteenth Day of December, 2020

Andrei Iancu  
*Director of the United States Patent and Trademark Office*